May 12, 1931.   C. W. SHATTO   1,805,380
FRUIT DIPPER
Filed Dec. 13, 1929    4 Sheets-Sheet 1

Inventor
Carl W. Shatto

By Clarence A. O'Brien
Attorney

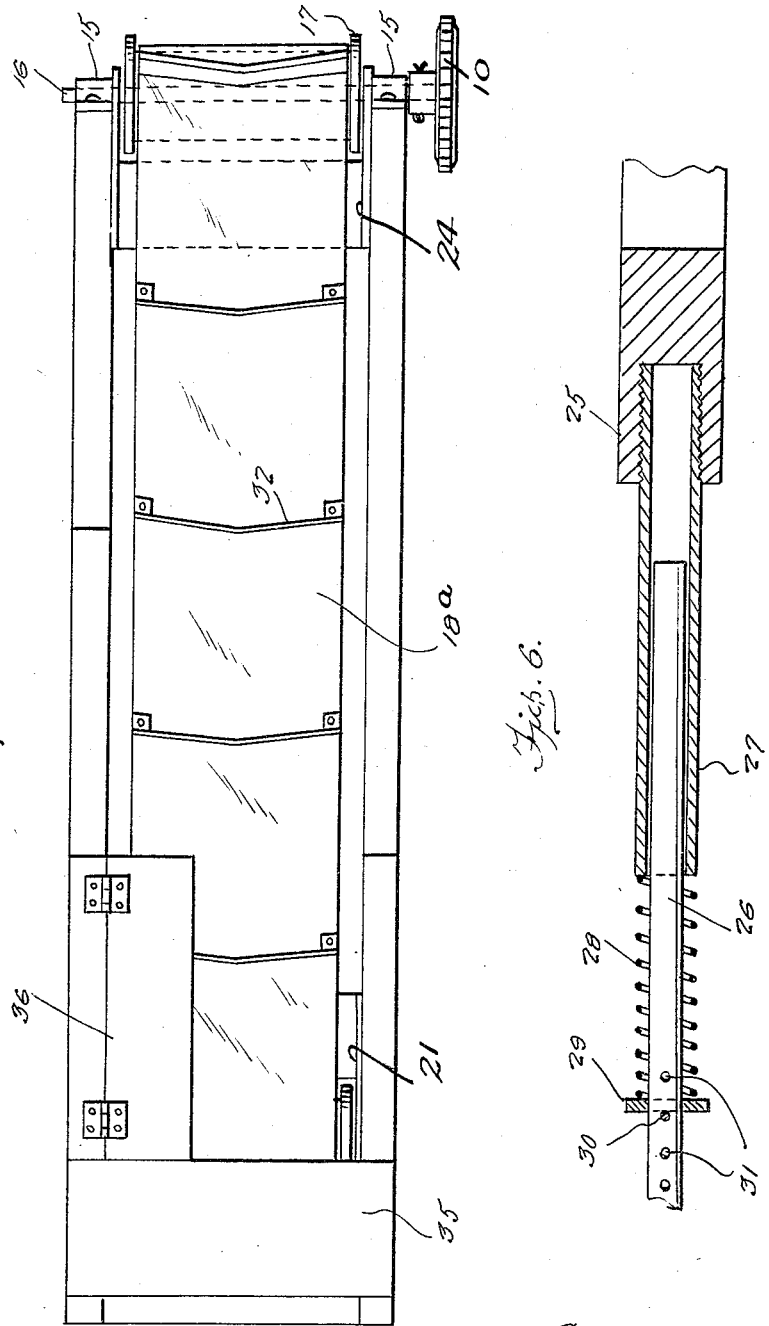

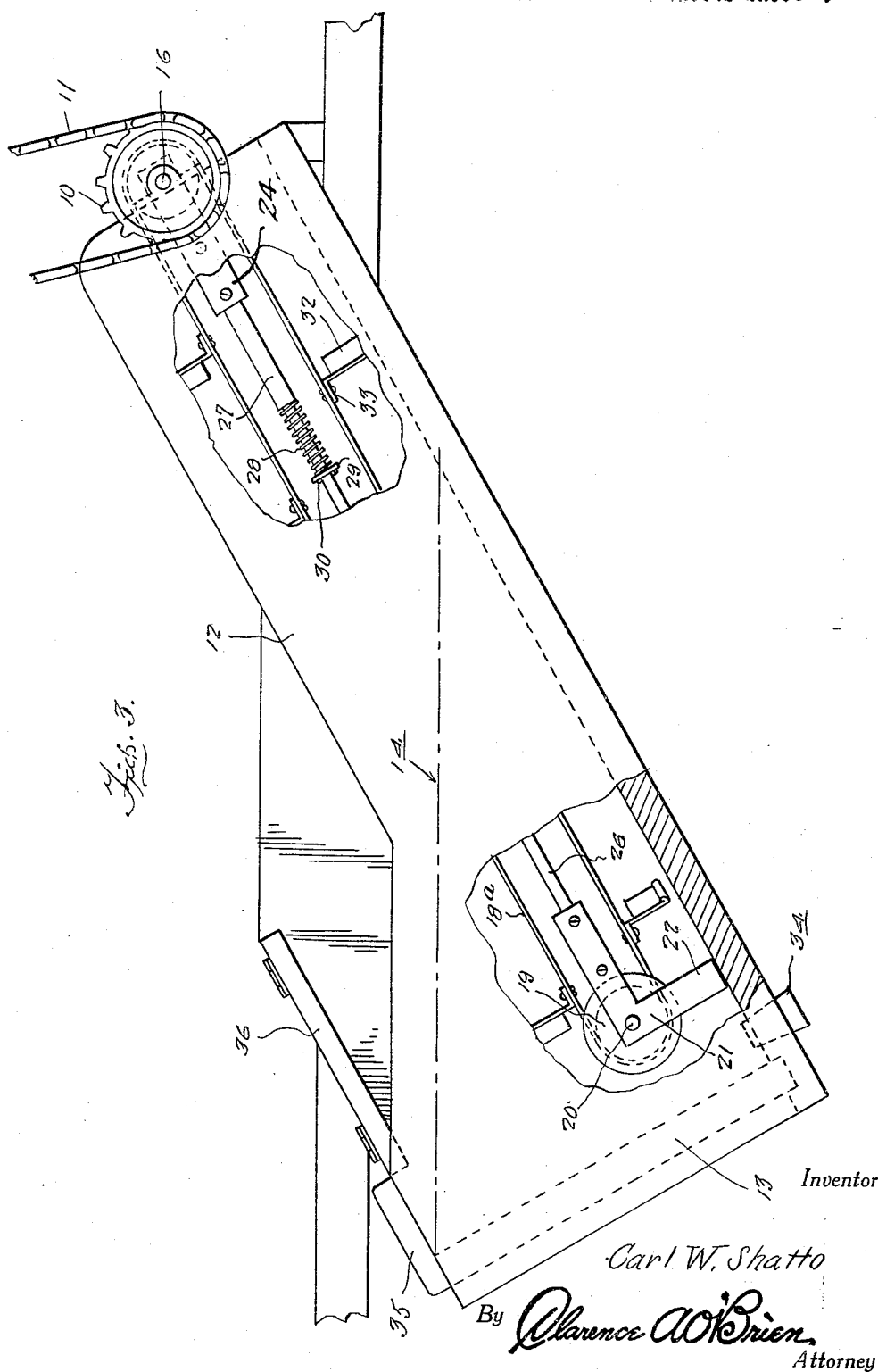

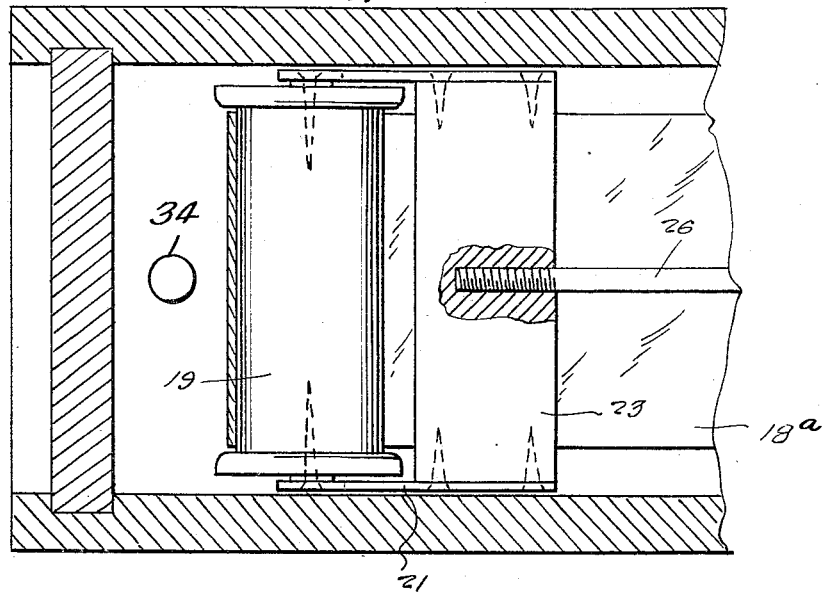
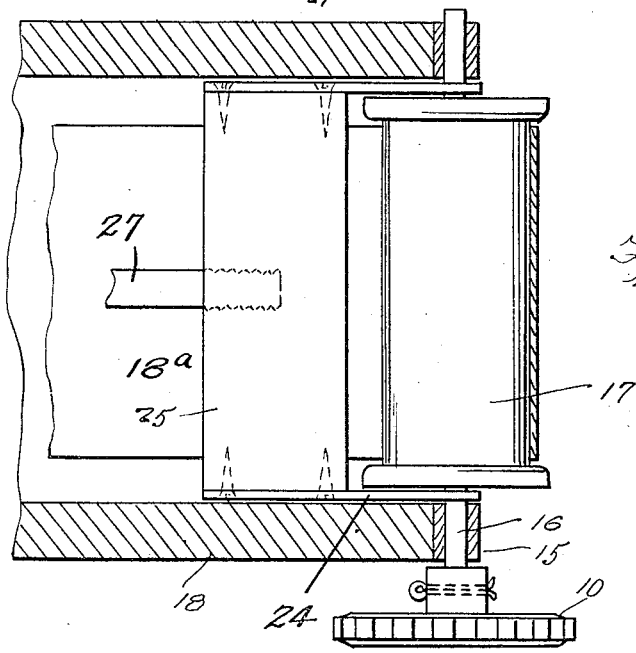

Patented May 12, 1931

1,805,380

UNITED STATES PATENT OFFICE

CARL W. SHATTO, OF SEBASTOPOL, CALIFORNIA

FRUIT DIPPER

Application filed December 13, 1929. Serial No. 413,819.

The present invention relates to fruit dippers designed particularly for a fruit peeling machine whereby to receive the fruit from the peeler for dipping in salt water or other desired solution.

One of the important objects of the present invention is to provide a dipper of this character for receiving the peeled fruit and including a conveyor operatively connected with the peeling apparatus and positioned within the dipper for removing the dipped fruit therefrom, said conveyor embodying conveying cleats by means of which the fruit may be drained as the same are removed and discharged from the dipper.

A further object of the invention is to provide a conveyor for the dipper having a driven shaft operatively connected with the drive means of the peeling machine and pivotally mounting one end of the conveyor on said shaft whereby to enable the conveyor to be raised outwardly of the solution within the dipper, when not in use, without detaching the conveyor from the drive means.

A still further object is to provide an apparatus of this character of a simple and practical construction, which is efficient and reliable in performance, relatively inexpensive to manufacture and install in operative position and otherwise well adapted for the purpose for which the same is designed.

Figure 1:
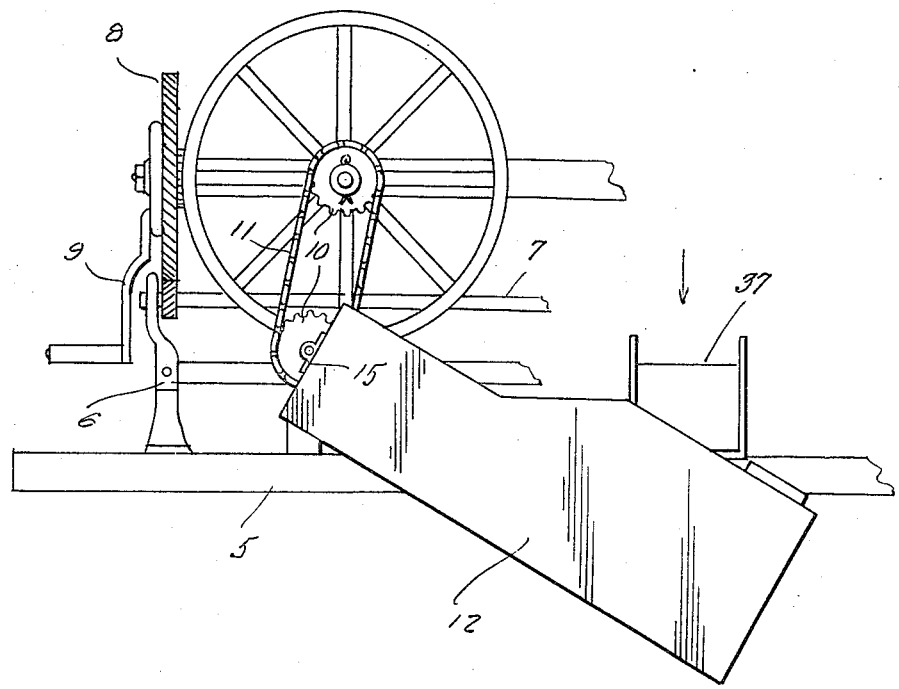
Figure 7:
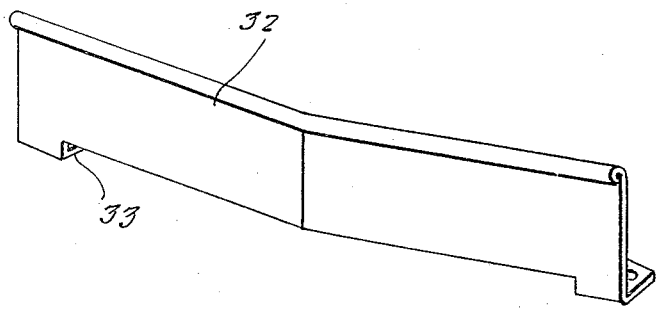

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:
Figure 1 is a side elevational view, Figure 2 is a top plan view, Figure 3 is an enlarged side elevational view of the dipper with parts broken away and shown in section, Figure 4 is a fragmentary sectional view through the lower end of the dipper and illustrating the inner end of the conveyor, Figure 5 is a similar view of the opposite end of the dipper, Figure 6 is a fragmentary longitudinal sectional view of the automatic belt tightening means for the conveyor, and Figure 7 is a perspective view of one of the conveyor cleats.

Referring now to the drawings in detail, wherein for the purpose of illustraton I have disclosed a preferred embodiment of the invention, the numeral 5 designates the supporting base or the drive means of the peeler, which drive means includes standards 6 having shafts 7 journaled therein and provided with gears 8 driven by a hand crank 9 or operating sprockets 10 interconnected by a chain 11.

The dipper per se comprises a trough 12 supported in an inclined position, as clearly illustrated in Figures 1 and 3 of the drawings having its lower end 13 closed whereby to retain a quantity of salt water or other desired solution to a level indicated by the dot and dash lines 14.

The upper end of the trough is open and is provided at its edges with bearing brackets 15 for rotatably supporting a shaft 16 extending transversely of the end of the trough and to which one of the sprockets 10 is keyed.

A spool or flange roller 17 is also keyed to the shaft 16 and positioned between the side walls 18 of the trough. A conveyor belt 18a is trained over the roller 17 and also about a companion roller 19 supported on a shaft 20 adjacent the lower end of the trough.

The shaft 20 is journaled in a pair of angular brackets 21 having one end formed into legs 22 and their opposite ends attached to the ends of a spacing member 23 positioned between the upper and lower flights of the belt.

Plates 24 are also pivotally carried at the ends of the shafts 16 and to which plates a spacing member 25 is secured likewise positioned between the upper and lower flights of the belt. The rollers 17 and 19 are retained in spaced relation by an automatic belt tightener consisting of a rod 26 threaded at one end into the edge of the lower spacing member 23 and with its opposite end telescopically projected in a tube 27 having one end threaded in the upper spacing member 25. A coil spring 28 is carried by the rod 26 and compressed between the end of the tube and a washer 29 retained on the rod by a pin 30 adjustable in openings 31 in the rod.

The outward surface of the belt is provided with cleats 32 preferably constructed of sheet metal and with their opposite sides outwardly from the center inclined forwardly in the direction of travel of the belt.

The lower edge of the cleats are provided with legs 33 for attaching to the belt in a manner to space the lower edge of the cleat from the belt to permit drainage of the liquid from the front side of the cleats.

The lowermost bottom portion of the trough is provided with a drain plug 34 and the upper edge of the trough, at its lower end, is provided with a transverse splash shield 35 and a side splash shield 36, the latter being hingedly secured to the upper edge of one of the sides 18.

The fruit is discharged from a peeling machine, of a type well known in the art, into the lower end of the trough by means of a chute 37 where the fruit is acted upon by the solution in the trough and then conveyed therefrom by the conveyor belt and discharged from the upper end of the trough.

The lower end of the conveyor may be raised upwardly out of the solution, when not in use, by reason of its pivoted upper end, without interrupting the operation of the peeler to which the drive for the conveyor is also operatively attached.

The parts of the device are constructed of suitable non-corrosive material to prevent deterioration by the salt or chemical in the solution.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. A fruit dipper of the type described for association with a conventional fruit peeler comprising a trough having an inclined bottom and its upper end open and its lower end closed so as to retain a quantity of treating fluid, a shaft carrying a roller at the upper end of the trough, a drive sprocket on one end of the shaft, a roller on a shaft journaled in brackets rested in the lower end of the trough, a conveyor belt trained between said rollers, rigid longitudinally adjustable means connected between said shafts for adjustably and automatically tensioning the conveyor belt, the connection of said means with the shaft at the upper end of the trough being pivotal so as to permit the lower end of the conveyor to be swung out of the lower end of the trough without disturbing the operative relation of the drive sprocket with the driving means of the peeler.

2. A fruit dipper of the type described comprising a trough having an inclined bottom, a shaft journaled in the sides of the upper end of the trough carrying a drive sprocket and a roller, a shaft journaled in brackets supported at the lower end of the bottom, a conveyor belt trained between said rollers, rigid adjustable means between said rollers for tensioning the belt and permitting the lower end of the conveyor to be swung upwardly, a non-movable and a movable splash shield on the lower end of the trough, a vertical splash extension on one wall of the lower end of the trough carrying said movable splash shield, said movable splash shield being on said splash extension and situated so as to be opposite the delivery chute of an associated fruit peeler.

3. A fruit dipper of the type described for operative association with a fruit peeler comprising a trough having an inclined bottom and adapted to have its upper end adjacent the drive means on the peeler and its lower end adjacent the discharge chute thereof, a shaft journaled on bearings on the upper end of the trough and carrying a conveyor roller, a pair of plates hinged in said shaft and carrying between them a block, a tube screw-threaded in the block, one end of a rod telescopically slidable in the tube; a pair of L-shaped brackets carrying at the angles thereof and between them a shaft having a conveyor roller for disposal at the lower end of the trough, a block carried between said brackets for screw-threadedly receiving the other end of the rod, a spring on the rod adjustable to abut the free end of said tube, a pin adjustable in a plurality of holes in the rod for adjusting said spring for tensioning a conveyor belt trained over said rollers, said hinged plates adapted to permit swinging the lower end of the conveyor out of the trough.

In testimony whereof I affix my signature.

CARL W. SHATTO.